(12) United States Patent
Vladimerou

(10) Patent No.: US 11,619,511 B2
(45) Date of Patent: Apr. 4, 2023

(54) SYSTEM AND METHOD FOR LOCAL STORAGE BASED MAPPING

(71) Applicant: Toyota Motor Engineering & Manufacturing North America, Inc., Plano, TX (US)

(72) Inventor: Vladimeros Vladimerou, Whitmore Lake, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 231 days.

(21) Appl. No.: 16/526,023

(22) Filed: Jul. 30, 2019

(65) Prior Publication Data

US 2021/0033416 A1 Feb. 4, 2021

(51) Int. Cl.
*G01C 21/36* (2006.01)
*G01C 21/34* (2006.01)

(52) U.S. Cl.
CPC ......... *G01C 21/367* (2013.01); *G01C 21/343* (2013.01); *G01C 21/3484* (2013.01); *G01C 21/3658* (2013.01)

(58) Field of Classification Search
CPC .............. G01C 21/367; G01C 21/3484; G01C 21/343; G01C 21/3658; G01C 21/387; G01C 21/3822
See application file for complete search history.

(56) References Cited

U.S. PATENT DOCUMENTS

| 6,029,195 A | 2/2000 | Herz |
| 8,682,575 B2 | 3/2014 | Sakashita |
| 9,644,969 B2 | 5/2017 | Koenig et al. |
| 2006/0080029 A1* | 4/2006 | Kodani ............. G08G 1/09685 701/420 |

(Continued)

FOREIGN PATENT DOCUMENTS

WO 2016130719 A2 8/2016

OTHER PUBLICATIONS

Guivant, et al. "Simultaneous localization and map building using natural features and absolute information," Robotics and Autonomous Systems, vol. 40, No. 2-3, pp. 79-90, Aug. 2002.

(Continued)

*Primary Examiner* — Rami Khatib
*Assistant Examiner* — Gabriel Joseph Rene Lambert
(74) *Attorney, Agent, or Firm* — Christopher G. Darrow; Darrow Mustafa PC

(57) ABSTRACT

A mapping system creates feature data associated with a first section of a route, stores the feature data in the local storage system as stored feature data, fuses the feature data with the stored feature data to create map data associated with the first section when the vehicle has traversed the first section and collected the stored feature data at least a threshold number of times, stores the map data in the local storage system, identifies one or more route sections as being part of one or more commute routes, and when space in the local storage system is insufficient for storage of the map data or (Continued)

the feature data, enables the storage by removing stored map data from the location storage system based at least in part on a determination that the removed data is not associated with the one or more commute routes.

28 Claims, 5 Drawing Sheets

(56) References Cited

U.S. PATENT DOCUMENTS

| | | | | |
|---|---|---|---|---|
| 2007/0219708 | A1* | 9/2007 | Brasche | H04W 4/029 |
| | | | | 701/457 |
| 2010/0094550 | A1* | 4/2010 | Tsurutome | G01C 21/3476 |
| | | | | 455/456.1 |
| 2010/0148952 | A1* | 6/2010 | Barajas | B60R 25/00 |
| | | | | 701/123 |
| 2013/0332069 | A1* | 12/2013 | Schunder | G01C 21/3881 |
| | | | | 701/430 |
| 2014/0222340 | A1* | 8/2014 | Celia | G01C 21/34 |
| | | | | 707/736 |
| 2014/0288765 | A1 | 9/2014 | Elwart et al. | |
| 2018/0188044 | A1 | 7/2018 | Wheeler | |
| 2018/0189323 | A1* | 7/2018 | Wheeler | G06F 12/0875 |
| 2018/0361585 | A1* | 12/2018 | Williams | G05D 1/0282 |
| 2019/0078896 | A1* | 3/2019 | Zhu | G08G 1/20 |
| 2020/0018607 | A1* | 1/2020 | Balu | G08G 1/065 |
| 2020/0173786 | A1* | 6/2020 | Viswanathan | G05D 1/0278 |

OTHER PUBLICATIONS

Uehara et al., "Line-based SLAM Considering Directional Distribution of Line Features in an Urban Environment" In International Conference on Computer Vision Theory and Applications. (2017).

Wu et al., "Vehicle localization using road markings". In Intelligent Vehicles Symposium (IV), 2013 IEEE. IEEE.

Smith et al. "Real-time monocular slam with straight lines". In Proceedings of the British Machine Vision Conference. BMVC. (2006).

Montemerlo, et al. "FastSLAM: A factored solution to the simultaneous localization and mapping problem". Proceedings of the AAAI National Conference on Artificial Intelligence, pp. 593-598. (2002).

* cited by examiner

SYSTEM AND METHOD FOR LOCAL STORAGE BASED MAPPING

TECHNICAL FIELD

The subject matter described herein relates, in general, to a system and method for environment mapping by a vehicle system, and, more particularly, to locally storing and managing created map data based on commute route prioritization.

BACKGROUND

Simultaneous localization and mapping (SLAM) techniques have been studied in many forms (e.g., GraphSLAM, FastSLAM), and using various sensors and techniques (e.g., natural, line-based, road markings, straight lines) to detect and map route features. For automated driving, a map is often an essential component. A map, coupled with a localization module, can be used to confirm that the output of onboard sensors agrees with historical data (e.g., road geometry, landmarks, etc.) where applicable. Vehicles, autonomous vehicles and driver-assist systems in vehicles may therefore be equipped with navigational systems that obtain map data from external sources, such as by downloading local sections of a map from a cloud-based server as needed. The downloaded sections may cover, for example, a local region such a state, county, or metropolitan area. In most cases the vehicle will only travel within a limited amount of the map data, leaving a majority of the stored map data unused but still occupying a significant amount of a limited local storage system.

As a vehicle travels, a conventional navigational system can also track and store routes that the vehicle has traversed, i.e., in association with the map data. In some cases, the navigational system may upload data indicating traveled routes to a server, which can raise privacy concerns, particularly if the driver is unaware that such data was collected and transmitted to a third party.

SUMMARY

The disclosed systems and methods relate to a manner of mapping routes traveled by a vehicle and storing the routes locally within a storage system of the vehicle.

In one embodiment, a mapping system of a vehicle, comprising one or more sensors configured to acquire information about an environment around the vehicle, a local storage system to store data, one or more processors, and a memory communicably coupled to the one or more processors and storing: a mapping module including instructions that when executed by the one or more processors cause the one or more processors to create feature data, associated with a first section of a route, that indicates features of the first section detected by the one or more sensors, store the feature data in the local storage system as stored feature data, fuse the feature data with the stored featured data to create map data associated with the first section when the vehicle has traversed the first section and collected the stored feature data at least a threshold number of times, and store the map data in the local storage system as stored map data, and a prioritization module including instructions that when executed by the one or more processors cause the one or more processors to identify one or more route sections indicated by the stored map data as being part of one or more commute routes traversed by the vehicle and, when an amount of storage in the local storage system is insufficient for storage of the map data or the feature data, enable the storage by removing stored map data associated with one or more sections from the local storage system based at least in part on a determination that the one or more sections are not associated with the one or more commute routes.

In another embodiment, a method of creating and managing map data for a vehicle having a local storage system, comprises creating feature data associated with a first section of a route, based on features of the first section detected by one or more sensors of the vehicle, storing the feature data in the local storage system as stored feature data, fusing the feature data with the stored feature data to create map data associated with the first section when the vehicle has traversed the first section and collected the stored feature data at least a threshold number of times, storing the map data in the local storage system, identifying one or more route sections indicated by the stored map data as being part of one or more commute routes traversed by the vehicle, and when an amount of storage in the local storage system is insufficient for storage of the map data or the feature data, enable the storage by removing stored map data associated with one or more sections from the location storage system based at least in part on a determination that the one or more sections are not associated with the one or more commute routes.

In still another embodiment, a non-transitory computer-readable medium for creating and managing map data for a vehicle includes instructions that, when executed by one or more processors, cause the one or more processors to create feature data associated with a first section of a route, based on features of the first section detected by one or more sensors of the vehicle, store the feature data in the local storage system as stored feature data, fuse the feature data with the stored feature data to create map data associated with the first section when the vehicle has traversed the first section and collected the stored feature data at least a threshold number of times, store the map data in the local storage system, identify one or more route sections indicated by the stored map data as being part of one or more commute routes traversed by the vehicle, and when an amount of storage in the local storage system is insufficient for storage of the map data or the feature data, enable the storage by removing stored map data associated with one or more sections from the location storage system based at least in part on a determination that the one or more sections are not associated with the one or more commute routes

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Systems, methods, and other embodiments associated with creating maps that cover routes traveled by a vehicle and storing the maps locally within a storage system of the vehicle are disclosed. As previously mentioned, a vehicle may be equipped with a navigational system that downloads map data from an external source for use in confirming sensor data, determining routes for the vehicle, and the like. However, the downloaded map data can include large sections of a region that the vehicle never traverses, thereby taking up unnecessary storage space. Furthermore, the service that provides the map data may in turn request information from the vehicle, such as data indicated routes traveled by the vehicle. Such requests may be transmitted and fulfilled entirely in background processes that the driver is unaware of, raising significant privacy concerns.

Therefore, a mapping system and associated methods are disclosed herein that provide an approach to creating map data based on where a vehicle has actually traveled and storing the map data locally, that is, within a storage of the vehicle, instead of downloading/uploading data from/to an external source. The disclosed embodiments can use sensor data acquired during the repetitive driving experience of a vehicle to create maps that can in turn be used by systems of the vehicle itself while traveling on its most frequented routes, such as commute routes. The disclosed embodiments can further prioritize storage of map data based on various factors, such as frequency of use.

The disclosed mapping system advantageously reduces communication and bandwidth needs associated with downloading maps and improves storage efficiency by significantly reducing the amount of unvisited map data stored locally by the vehicle. Additional advantages include: 1) shifting processing tasks to the vehicle as opposed to potentially paying for external servers to handle processing, 2) reducing privacy concerns by removing the need to upload/download routing information to a third party, and 3) improving mapping accuracy by continuously updating map data locally rather than waiting for a third party update.

Figure 1:
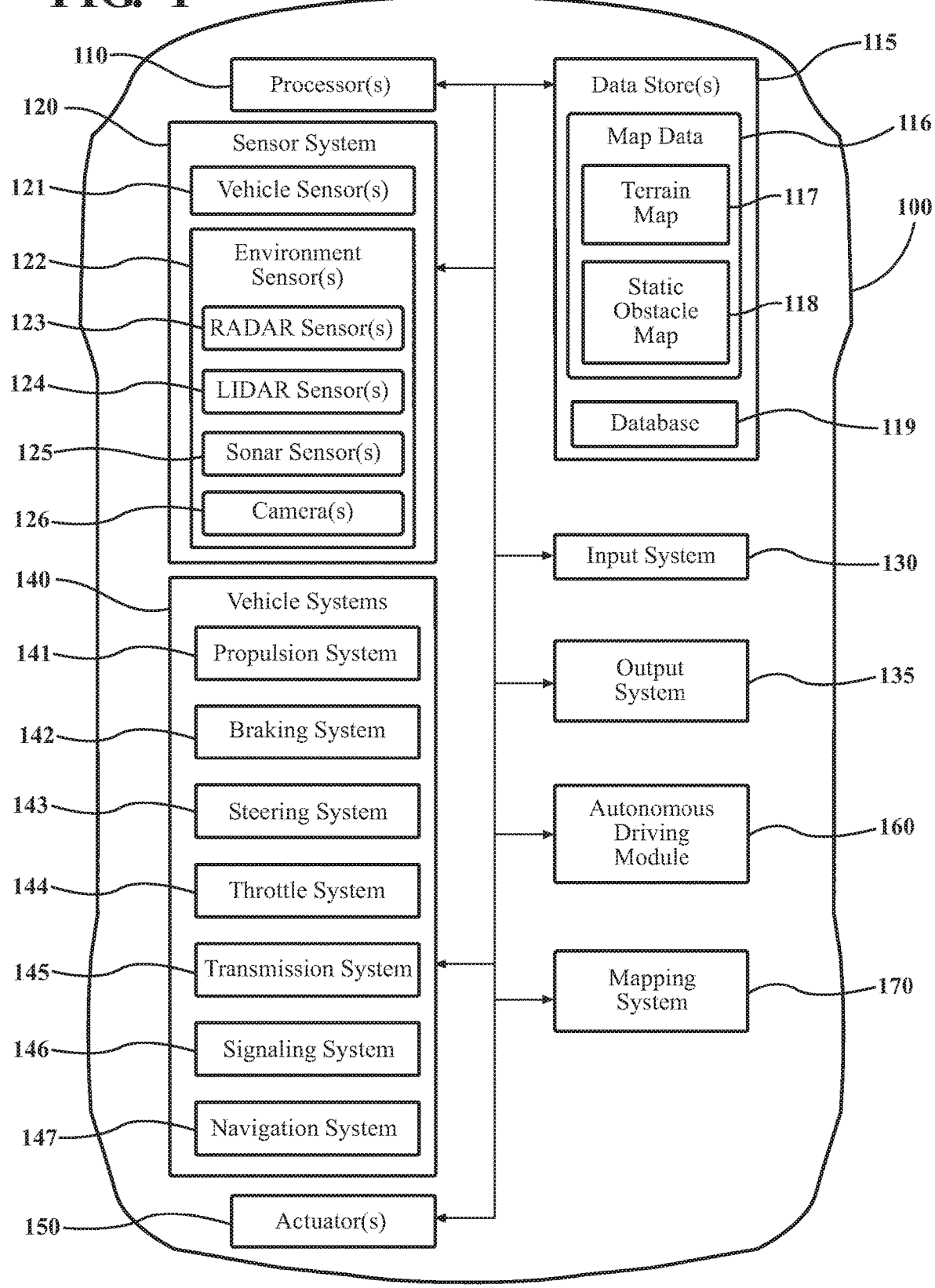
FIG. 1 illustrates one embodiment of a vehicle within which systems and methods disclosed herein may be implemented.

Referring to FIG. 1, an example of a vehicle 100 is illustrated. As used herein, a "vehicle" is any form of powered transport. In one or more implementations, the vehicle 100 is an automobile. While arrangements will be described herein with respect to automobiles, it will be understood that embodiments are not limited to automobiles. In some implementations, the vehicle 100 may be any robotic device or form of powered transport that, for example, is equipped for communicating with vehicles or other devices and includes sensors to perceive aspects of the surrounding environment, and thus benefits from the functionality discussed herein to determine, for example, lane changes of other entities travelling in relation to the vehicle 100.

As shown in FIG. 1, the vehicle 100 includes multiple elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100. Further, the elements shown may be physically separated by large distances.

Some of the possible elements of the vehicle 100 are shown in FIG. 1 and will be described along with subsequent figures. However, a more detailed description of many of the elements in FIG. 1 will be provided after the discussion of FIGS. 2, 3A, 3B, 4, and 5 for purposes of brevity in this description. It will be appreciated that for simplicity and clarity of illustration, where appropriate, reference numerals have been repeated among the different figures to indicate corresponding or analogous elements. In addition, while the discussion outlines numerous specific details to provide a thorough understanding of the embodiments described herein, those of skill in the art, will understand that the embodiments described herein may be practiced using various combinations of these elements.

In any case, the vehicle 100 includes a mapping system 170 that is implemented to perform methods and other functions as disclosed herein relating to creating and managing map data. The noted functions and methods will become more apparent in the following discussion of the figures.

Figure 2:
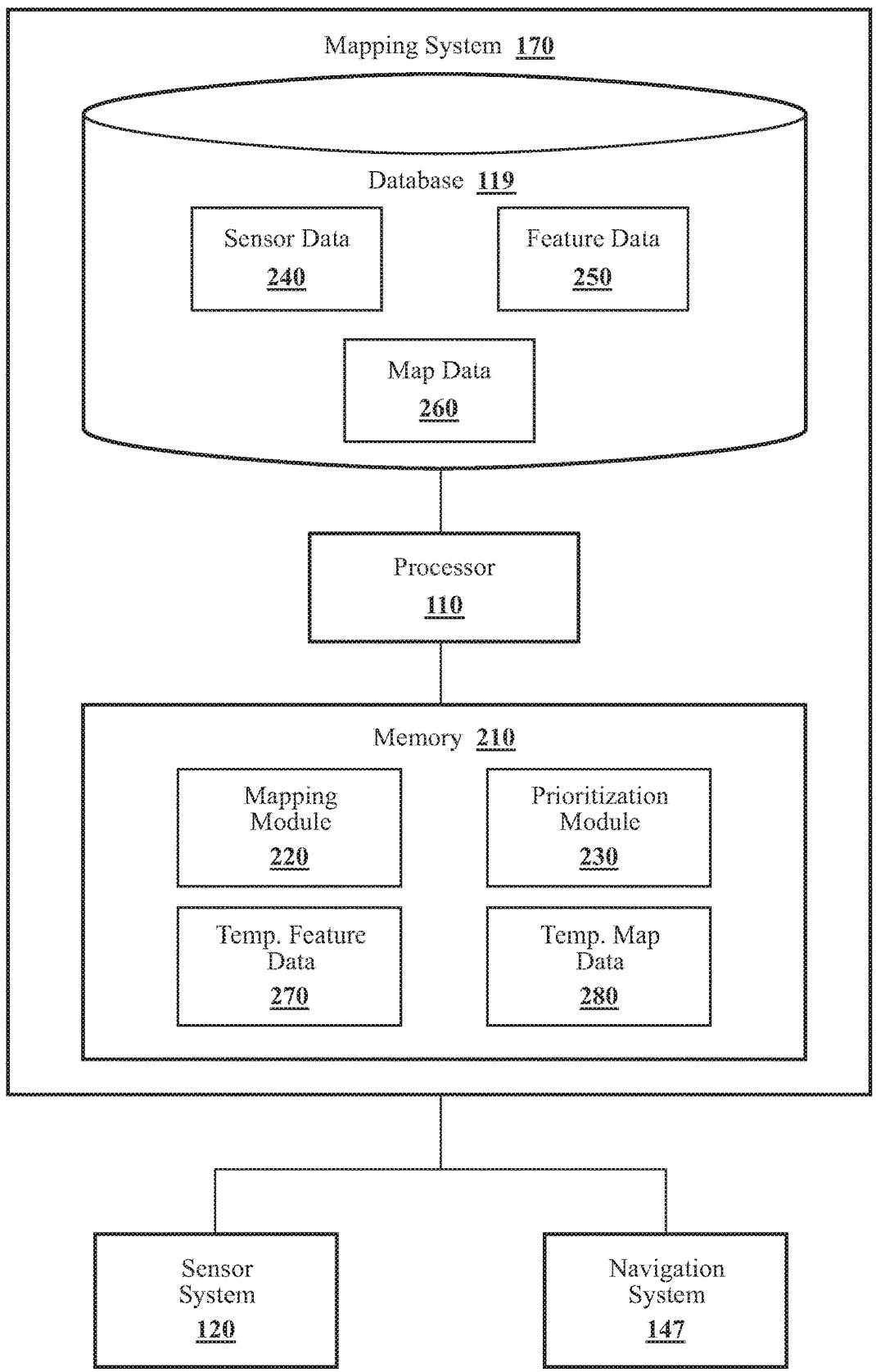
FIG. 2 illustrates one embodiment of a mapping system according to the disclosed embodiments.

With reference to FIG. 2, one embodiment of the mapping system 170 of FIG. 1 is illustrated. The mapping system 170 is shown as including a processor 110 and database 119 from the vehicle 100 of FIG. 1, as well as a memory 210.

In one or more embodiments, the processor 110 may be a part of the mapping system 170, the mapping system 170 may include a processor separate from the processor 110 of the vehicle 100, or the mapping system 170 may access the processor 110 through a data bus or another communication path.

The database 119 can store, among other information, sensor data 240, feature data 250 and map data 260, which will be described in turn further below. The database 119 is, in one or more embodiments, an electronic data structure that can be stored in the memory 210 or another data store of the vehicle 100, such as the vehicle 100 data store 115, a removable memory device, or another suitable local location that is accessible to modules 220 and 230 stored in the memory 210. The database 119 is configured with routines that can be executed by the processor 110 for analyzing stored data, providing stored data, organizing stored data, and so on. Thus, in one embodiment, the database 119 stores data as described above that is used by modules 220 and 230 in executing various functions, as well as other types of data.

The memory 210 can store, among other things, a mapping module 220, a prioritization module 230, temporary feature data 270 and temporary map data 280. The memory 210 can be implemented as a random-access memory (RAM), read-only memory (ROM), a hard-disk drive, a flash memory, or other suitable memory for storing the modules 220 and 230 and temporary data 270 and 280. The modules 220 and 230 can be, for example, constructed as computer-readable instructions that when executed by the processor 110 cause the processor 110 to perform the various functions disclosed herein.

Figure 3A:
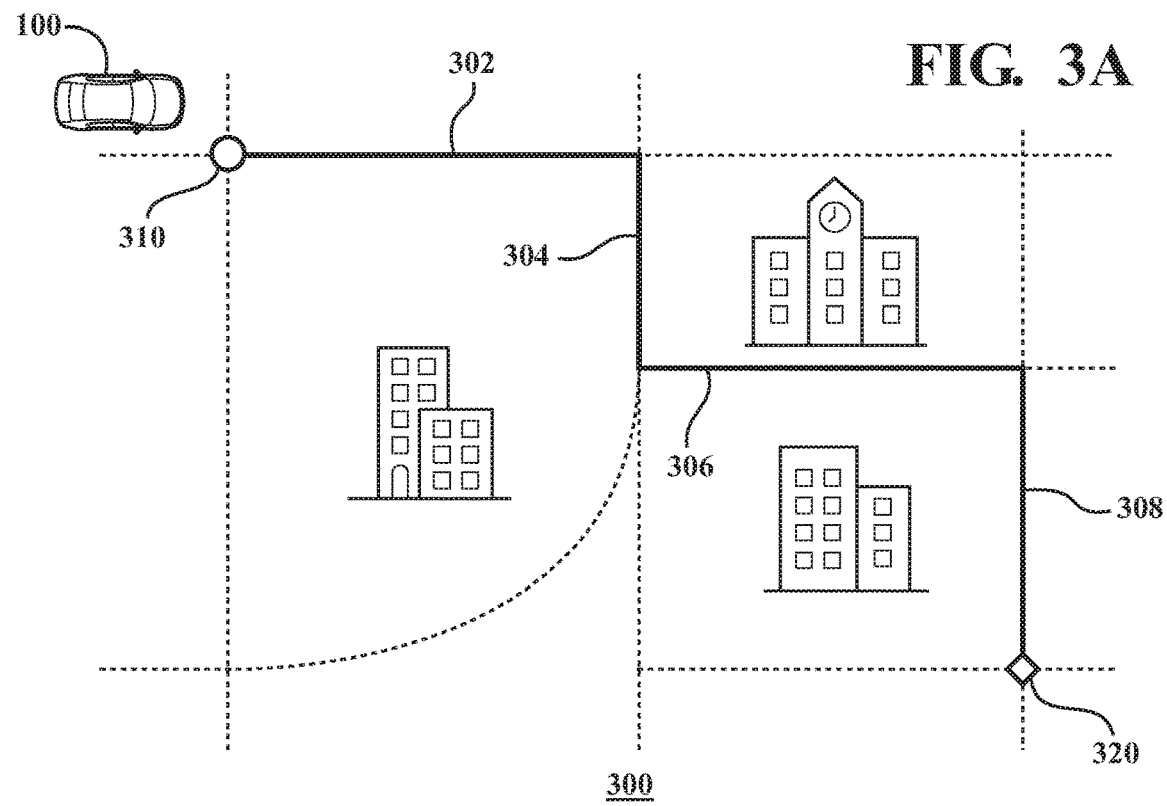
FIG. 3A illustrates an example route according to the disclosed embodiments.
Figure 3B:
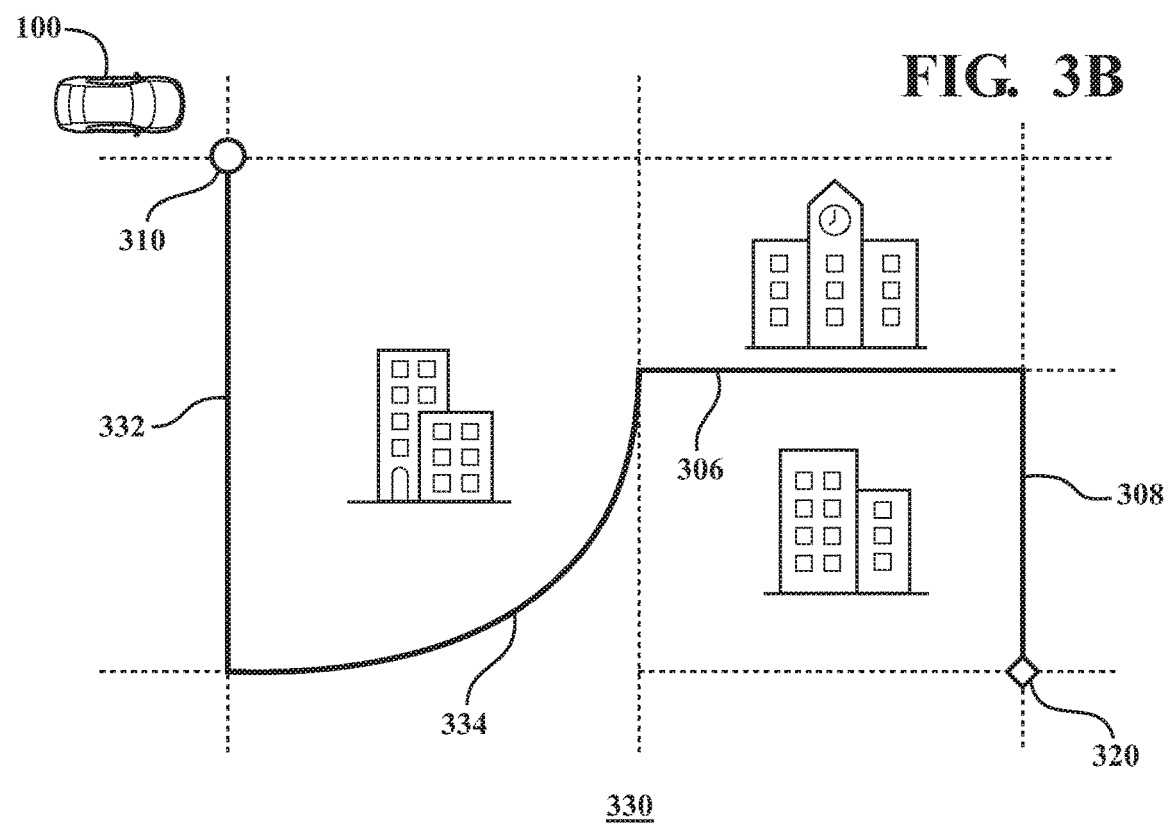
FIG. 3B illustrates another example route according to the disclosed embodiments.

A "route" as used herein refers to a path of travel for the vehicle 100 between a starting point and a destination. A "section" of a route, as used herein, can be defined as a segment of a route that does not include a branch turn or a hard turn, e.g., an intersection turn or stop sign turn. FIG. 3A shows an example route 300 for vehicle 100 to travel from a starting location 310 to a destination 320. The route 300 can be defined as including individual sections 302, 304, 306, and 308. Similarly, FIG. 3B shows a different route 330 for vehicle 100 to travel between starting location 310 to a destination 320. The route 330 can be defined as including individual sections 332, 334, 306, and 308. Accordingly, a "route" as used herein can include one or more sections. Note that although section 334 includes a curve, since the curve is not a hard turn (e.g., the turn from section 306 to section 308), the entire curve is considered a single section. Furthermore, as shown, it is possible for different routes to include one or more of the same sections (e.g., in this case routes 300 and 330, although different, both include sections 306 and 308).

Referring back to FIGS. 1 and 2, the mapping module 220 generally includes instructions that function to control the processor 110 to analyze sensor data 240 generated by the sensor system 120 to create temporary feature data 270, which can be stored in database 119 as feature data 250, associated with a section of a route traveled by the vehicle 100. The feature data 250 indicates features of the section detected by the sensor system 120. The features can include any of one or more detectable features associated with the section of the route, such as, number of lanes, lane marker type, width of lane, curvature of road, intersections, signs, stationary landmarks, elevation, road type, road grade, existence and location of opposite direction traffic, etc. The mapping module 220 can use any of various machine learning-based or deep learning-based approaches, such as support vector machines (SVM) or convolution neural networks (CNN) to identify the features in the sensor data 240.

After the vehicle 100 has traversed a given section at least a threshold number of times (e.g., three times) and stored multiple feature data 250 associated with the section, the mapping module 220 controls the processor 110 to fuse the multiple feature data 250 to create temporary map data 280, which can be stored locally at the vehicle 100, i.e., in the database 119 as map data 260 associated with the section.

Figure 4:
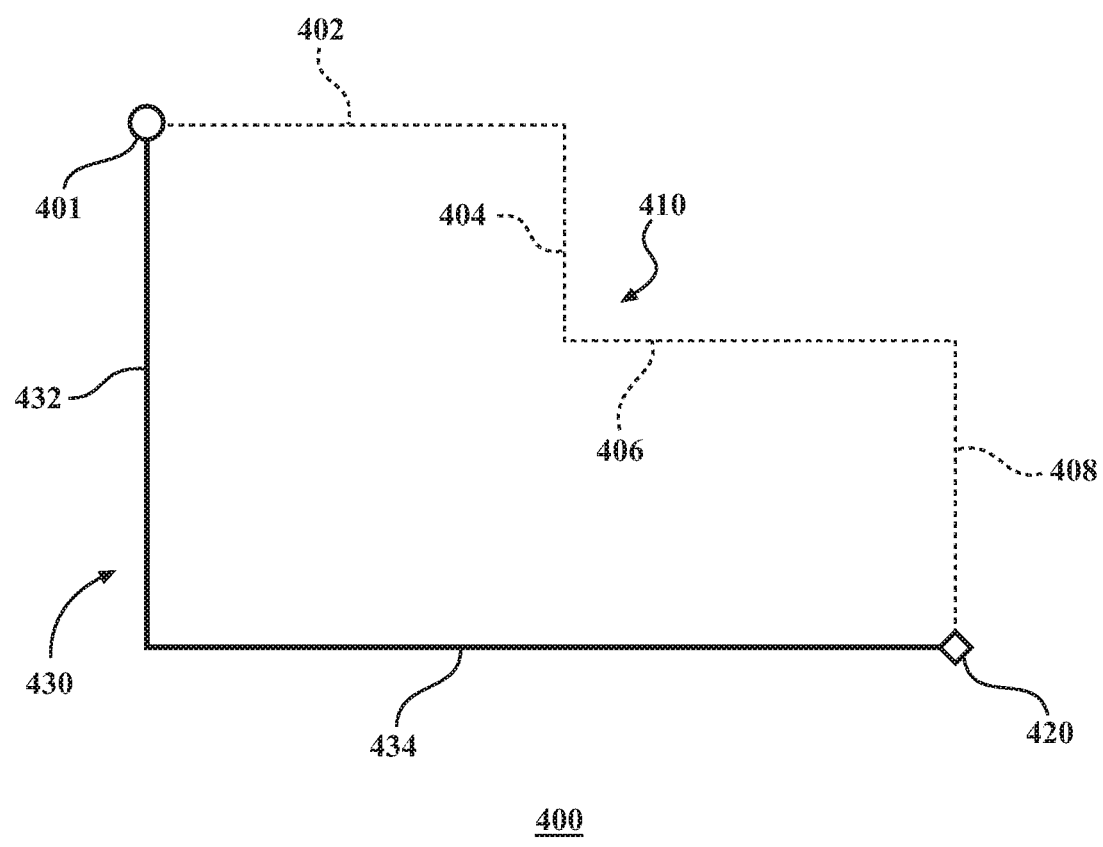
FIG. 4 illustrates an example of map data according to the disclosed embodiments.

FIG. 4 shows an example map 400 that can be defined based on data obtained by the vehicle 100 repeatedly traversing routes 300 and 330 shown in FIGS. 3A and 3B. The map data 260 that defines map 400 may be hierarchically defined, with the map 400 being constructed of routes (e.g., 410 and 430) and the routes being constructed of sections (e.g., 402, 404, 406, 408, 432, and 434). The map data 260 can further include, for example, data defining the route 410 as beginning at starting point 401, ending at destination 420, and including sections 402, 404, 406, and 408. The map 400 can similarly include data defining the route 430 as beginning at staring point 401, ending at destination 420, and including sections 432 and 434. The map 400 can include data indicating features of each of the sections 402, 404, 406, 408, 432, and 434.

As will be seen, segmentation of the map 400 into routes and sections provides several advantages, such as allowing for higher selectivity in storage prioritization than would analysis on a per route basis. Segmentation also allows the mapping system 170 to refine smaller segments of a trip, e.g., commonly traveled sections, that may have increased importance due to their appearance in multiple routes.

For example, by storing multiple feature data 250 associated with a section prior to incorporating the feature data 250 into the map data 260, the mapping module 220 can increase the accuracy of the map data 260 representation of the associated section.

Generally, the mapping module 220 can fuse datasets (e.g., temporary feature data 270, feature data 250) to create or update map data 260 in any of various ways. For example, in one or more embodiments the mapping module 220 can fuse multiple datasets by identifying any differences in the datasets regarding a given feature (e.g., location, orientation, size, position, etc.) and averaging the difference values to create fused data as map data 260.

In one or more embodiments the mapping module 220 can fuse newly temporary feature data 270 directly with existing stored map data 260 that is associated with the same section. In this manner the mapping module 220 can leverage the most recent sensor data 240 obtained during repeated trips along a route, for example, a commute route, to continually update and improve stored map data 260 on an ongoing basis.

The determination to fuse temporary feature data 270 directly with existing stored map data 260 can occur in any of several ways. In one or more embodiments the mapping module 220 can present the driver with a menu of stored map data 260 (e.g., shapes of the stored routes, metadata such as time or coordinates associated with the routes, etc.) via an interface of vehicle 100 to give the driver an opportunity to select a stored route that the driver intends to travel, thereby informing the mapping module 220 about the map data 260 to which the upcoming temporary feature data 270 is to be fused. In one or more embodiments, the mapping module 220 can automatically analyze temporary feature data 270 and compare it against stored map data 260 and determine to fuse the temporary feature data 270 with stored map data 260 when a similarity above a threshold amount exists without requiring driver input.

While the map data 260 created by the mapping module 220 as described above is likely to be a more efficient use of storage than conventional, regional map downloads, in some implementations the mapping system 170 may be allotted a limited amount of storage space in the local storage system of the vehicle 100. To further improve the efficiency of storage use by the mapping system 170, the prioritization module 230 can determine sections represented in map data 260 to be removed.

The prioritization module 230 generally includes instructions that function to control the processor 110 to identify one or more sections indicated by the map data 260 as being part of one or more commute routes traversed by the vehicle 100. The prioritization module 230 can identify a route as being a commute route in any of various ways. For example, the prioritization module 230 can identify a route as being a commute route based on the vehicle 100 repeatedly parking at a given route destination for longer than a threshold amount of time (e.g., five hours) on weekdays. The prioritization module 230 can store an indication, such as a flag or metadata, that identifies which map data 260 sections are determined to be associated with a commute route.

As commute routes are likely to be among the most frequently utilized routes the vehicle 100 will traverse, the prioritization module 230 can prioritize storing map data 260 associated with sections that are part of commute routes. Accordingly, in one or more embodiments when an amount of allotted storage in the database 119 is below a threshold amount or is insufficient to receive temporary feature data 270 or temporary map data 280 for storage, the prioritization module 230 can remove map data 260 associated with one or more sections from the database 119 based at least in part on a determination that the one or more sections are not associated with a commute route. As will be discussed further below, in one or more embodiments the prioritization module 230 can further determine which sections of map data 260 to remove based on various other factors and/or combinations of factors.

Referring back to FIG. 2, the mapping system 170 can include or be operably connected with the navigation system 147 and with the sensor system 120, as indicated above. In one or more embodiments, the sensor system 120 can include, for example, one or more of a camera, a radar sensor, a sonar sensor, or a lidar sensor, or other type of sensor capable of obtaining data indicative of features of an environment (e.g., section, route, etc.) the vehicle 100 traverses. The sensor system 120 can therefore generate sensor data 240 which is transferred to the database 119 for storage. As used herein, "sensor data" can include captured raw data indicative of objects in the vicinity of the vehicle 100, such as other vehicles, lanes of a road, pedestrians, signs, etc., as well as environmental data such as weather, temperature, etc. The sensor data 240 may also include other information, such as timestamp information, metadata indicating additional information such as the source of the data, global positioning system (GPS) coordinates, and so on. Thus, as described above, the sensor data 240 can provide information that components of the mapping system 170 can use to generate feature data 250 and map data 260 that define or provide details regarding routes that the vehicle 100 has traversed. In one or more embodiments, the sensor data 240 associated with a given section is discarded after the mapping module 220 has extracted temporary feature data 270 for the section.

In one or more embodiments, the mapping system 170 can transmit or upload one or more sections of map data 260 to an external storage system, such as a cloud server, for example, to allow other users to download the one or more sections to enhance or augment their own maps. Likewise, in one or more embodiments the mapping system 170 can obtain one or more sections from an external storage to augment or enhance the map data 260. Uploading or downloading processed sections of map data 260 in this manner is more cost effective than uploading raw sensor data 240 used to assemble comparable maps and abstractly allows processing of the sensor data 240 to take place at a "vehicle" level as opposed to, for example, a "server" level.

Figure 5:
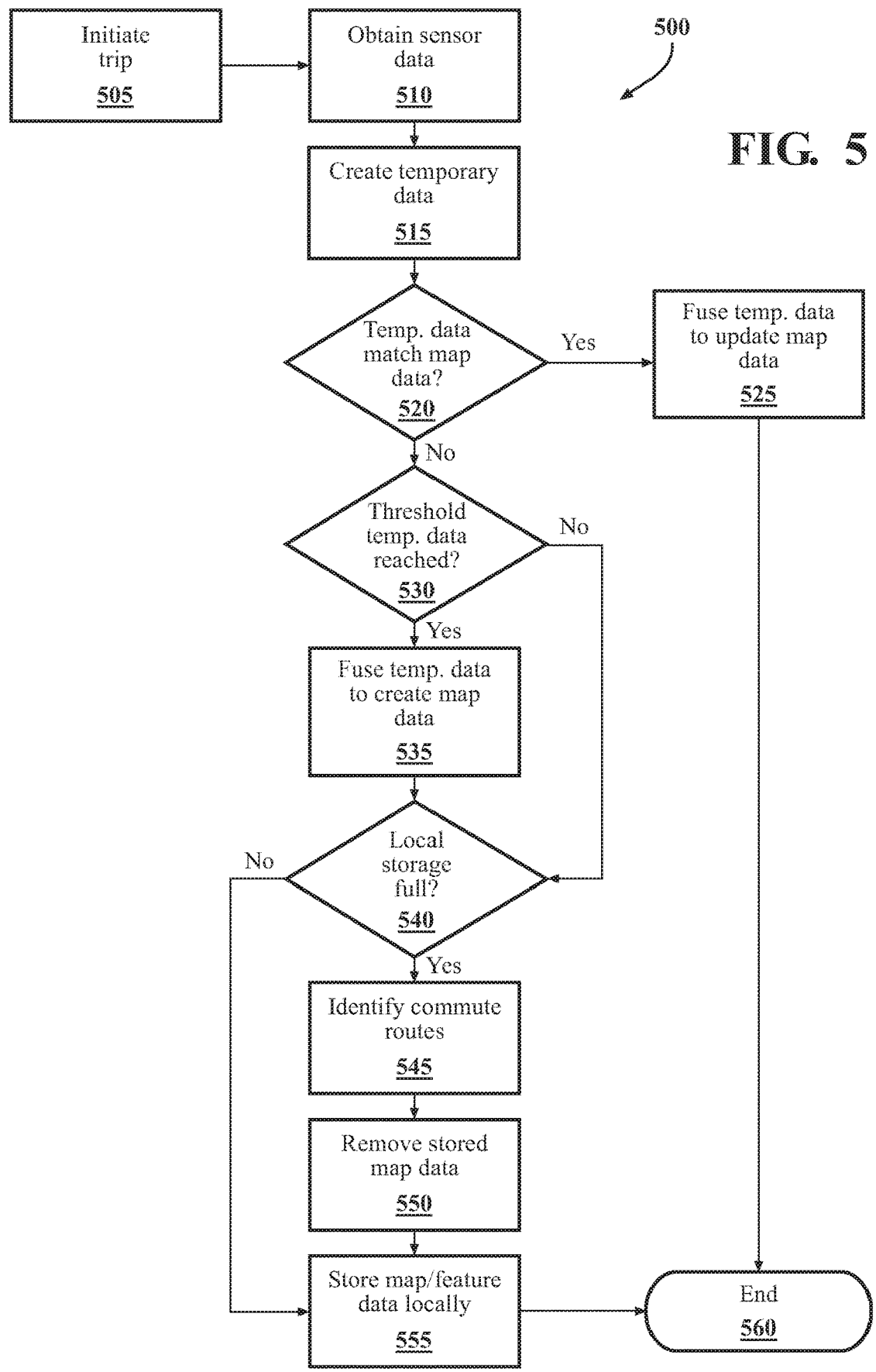
FIG. 5 illustrates a flow chart of a map creating process according the disclosed embodiments.

FIG. 5 illustrates a flowchart of a process 500 of creating and managing map data according to the disclosed embodiments. Method 500 will be discussed from the perspective of the mapping system 170 of FIGS. 1 and 2. While method 500 is discussed in combination with the mapping system 170, it should be understood that the method 500 is not limited to implementation within the mapping system 170, which is merely one example of a system that may implement the method 500.

At operation 505 the vehicle 100 initiates a trip. In one or more embodiments, if any map data 260 representing one or more previously traversed routes is currently stored in the database 119, the mapping system 170 can present the driver with the option to select a stored route, e.g., by showing a list of routes stored in map data 260. If the driver is planning to drive the trip on a route that is already stored, the driver can select the route to indicate that any sensor data 240 collected on the trip can be used to update or enhance the stored map data 260 that represents the route.

At operation 510 the mapping system 170 obtains sensor data 240 from the sensor system 120 as the vehicle 100 completes the trip. In one or more embodiments the mapping system 170 continuously or periodically samples the sensor data 240 along each segment of the route. For example, in one implementation the sensor system 120 can include one or more cameras that capture images, e.g., two images per second. The obtained sensor data 240 samples can be associated with respective individual segments of the route. For example, referring to FIG. 3A, the mapping system 170 can obtain sensor data 240 respectively associated with segment 302, segment 304, segment 306, and segment 308.

At operation 515 the mapping module 220 analyzes the sensor data 240 to identify features in the associated segment that can be used for creating or enhancing map data 260. The exact features that are extracted can vary according to implementation and sensor configuration. For example, the features can include one or more of a number of lanes of travel in the segment, lane marker types in the segment, width of a lane of the segment, degrees of curvature of the road in the segment, intersections in the segment, signs, stationary landmarks, elevation, road type (e.g., paved, gravel, etc.), road grade in the segment, and existence and location of opposite direction traffic. The mapping module 220 can use the data that indicates the identified features to create temporary feature data 270.

In one or more embodiments, the mapping module 220 can adjust a number of features identified to create the temporary feature data 270. For example, in one or more embodiments, the mapping module 220 can combine a high number of features to result in a relatively highly detailed representation of the segment, while in one or more other embodiments the mapping module 220 can use a relatively low number of features (e.g., two or three), resulting in feature data 250 that requires less storage space.

Referring to FIG. 3A, the mapping module 220 can create the temporary feature data 270 associated with a segment, e.g., segment 302. In one or more embodiments, temporary feature data 270 that corresponds with a segment can include metadata that indicates coordinates (e.g., GPS coordinates) for the segment and/or coordinates for certain features (e.g., landmark features) detected within the segment.

In one or more embodiments, the mapping module 220 can analyze the sensor data 240 and create the temporary feature data 270 when the mapping system 170 detects that the vehicle 100 has reached the end of a segment, e.g., as indicated by detecting certain behaviors and/or action sequences of the vehicle 100, such as coming to a stop or slowing down and making a turn above a threshold degree. In one or more embodiments the mapping module 220 can create the temporary feature data 270 at the end of the trip, for example, as indicated by the vehicle 100 coming to a complete stop and shutting down.

Referring back to FIG. 5, at operation 520 the mapping module 220 determines whether the temporary feature data 270 for a given segment (e.g., segment 302, FIG. 3A) matches map data 260 for a segment already stored in the database 119. The mapping module 220 can make this determination in any of several ways. In one implementation, if the temporary feature data 270 includes coordinate data for the segment, the mapping module 220 can check whether any map data 260 is associated with a segment having the same coordinate data. In another implementation, if the driver previously indicated that the current trip will traverse an already stored route, the mapping module 220 determines whether the temporary feature data 270 corresponds with a segment of the route that the driver selected. In another implementation, the mapping module 220 can compare feature values in the temporary feature data 270 against feature values in stored map data 260 segments to determine whether the two correspond above a threshold amount to identify a match. For example, if the temporary feature data 270 indicates a segment having a solid lane line, a lane width of nine feet, a road grade pattern of increasing from three to ten percent, an overall straight shape, etc., the mapping module 220 can determine whether a segment represented in the map data 260 matches the values within a threshold margin of error.

If the temporary feature data 270 corresponds to a segment that is already represented in stored map data 260, at operation 525 the mapping module 220 determines that both refer to the same segment (i.e., the vehicle 100 has already traversed this segment before) and fuses the temporary feature data 270 with the previously stored map data 260 to update or further enhance the map data 260. For example, there may be portions of the map data 260 that are incomplete or inaccurate due to detection error, unfavorable detection conditions, recent changes that have occurred along the segment, or the like. Accordingly, by updating the map data 260 with the most recently obtained temporary feature data 270, the map data 260 is continually being improved and updated locally, rather than waiting for a third party to discover errors and push out an update.

Fusing the temporary feature data 270 with the map data 260 for a given section can include updating metadata parameters associated with the section. For example, metadata parameters can include a frequency value that indicates a number of times that the section had been traversed, and a recency value that indicates a timestamp of the most recent traversal of the section. After the map data 260 is updated, the process can end at 560.

If the temporary feature data 270 is associated with a segment that does not correspond to any segment in the stored map data 260, at operation 530 the mapping module determines whether the vehicle 100 has previously traversed the segment and stored feature data 250 a threshold number of times (e.g., three times). For example, in one or more embodiments the mapping module 220 can determine whether the temporary feature data 270 corresponds to a segment that is already represented in stored feature data 250.

If the mapping module 220 determines that the vehicle 100 has previously traversed the segment at least the threshold number of times and correspondingly stored feature data 250 associated with the segment, at operation 535 the mapping module 220 fuses the temporary feature data 270 and the stored feature data 250 to create temporary map data 280 that corresponds with the segment. Fusing multiple data sets in this manner to create the new map data for a segment increases the reliability of the resulting map data. In one or more embodiments, the fusing threshold can be increased or lowered depending on the desired level of reliability of the map data. After fusing the temporary feature data 270 and the stored feature data 250, the process proceeds to operation 540.

Alternatively, if the mapping module 220 determines that the vehicle 100 has not previously traversed the segment for the threshold number of times and stored associated feature data 250, then the process proceeds to operation 540 without fusing data.

At operation 540 the prioritization module 230 checks whether the local storage system has the capacity to receive and store the temporary feature data 270/temporary map data 280 (i.e., the "new section data"). If the prioritization module 230 determines that the local storage system has enough open space to store the new section data, then the data is stored at operation 555 and the process ends at 560.

However, if the prioritization module 230 determines that the local storage system does not have enough space to store the new section data, then the prioritization module 230 initiates a process to remove one or more sections of stored map data 260 to enable storage of the new section data.

At operation 545 the prioritization module 230 identifies commute routes in the map data 260. The prioritization module 230 can identify a route as being a commute route, for example, based on the vehicle 100 repeatedly remaining parked for longer than a threshold time (e.g., four hours) at both a starting point and a destination of the route, or by using other techniques to identify commute routes. When a route is identified as a commute route, each section in the route is identified as a commute section. For example, referring to FIG. 4, if the prioritization module 230 identifies route 430 as being a commute route, sections 432 and 434 are in turn identified as commute sections. Based at least in part on the identification of commute routes, or the lack thereof, at operation 550 the prioritization module 230 determines one or more sections represented in the map data 260 to delete and thereby enable storage of the new section data.

Generally, commute sections are more likely to be subject to repeated use than non-commute sections. The prioritization module 230 can leverage this probability in any of various ways in determining one or more sections of map data 260 to remove. In one or more embodiments, the prioritization module 230 can determine a value score for each section indicated by the map data 260 and remove map data associated with one or more sections based at least in part on the value score.

The value score can be determined in various ways. In one or more embodiments the value score can be determined according to a function of a recency function, a frequency function, and a commute indicator function, where the recency function indicates at least how recently the vehicle traversed the give section, the frequency function indicates at least how many times the vehicle has traversed the given section, and the commute indicator function indicates at least whether the given section is part of a commute route. An example function can be defined as:

$$v(s) = w_f f(s) + w_r r(s) + l_c(s) \qquad \text{Eq. 1}$$

where v(s) is the value score, r(s) is a recency value that indicates how recently the vehicle traversed the given section, f(s) is a frequency value that indicates a frequency at which the vehicle traverses the given section, $w_f$ is a frequency weight value, $w_r$ is a recency weight value, and $l_c(s)$ is a value that indicates whether the given section is a commute route. The recency value and the frequency value can be determined, for example, based on metadata associated with the section that record how often a section is traversed and the last time the section was traversed, as previously described.

The weight values can be set to raise or lower the impact of frequency or recency on the removal decision. For example, in one or more embodiments the recency weight value can be set higher than the frequency weight value (e.g., 2:1 ratio) so that most recently traversed sections are less likely to be removed. In one or more embodiments the commute value can be a relatively high value compared to the highest weight value (e.g., 2:1 ratio) so that commute routes are most likely to score high enough to avoid being removed unless they have extremely low frequency and recency values, which would indicate that the commute route is no longer being used on a regular basis.

Equation 1 is one example of how to determine a value score. Other formulations may be used to determine the value score. However the value score is determined, the prioritization module 230 assigns a value score to each section and at operation 550 removes the lowest score sections of map data 260 from the local storage until the local storage has enough space to store the incoming new section data (i.e, temporary feature data 270 or temporary map data 280).

In one or more embodiments, the prioritization module can categorize each section indicated by the map data according to a plurality of categories, determine a priority order for the plurality of categories, and remove the map data 260 associated with the one or more sections based at least in part on a category of the second section. For example, in one or more embodiments the plurality of categories can include, in decreasing priority order, two or more of the following:

1. Sections in a most recently traversed route
2. Sections of commute routes traversed more than once within a threshold number of days
3. Sections of non-commute routes traversed more than once within the threshold number of days
4. Sections traversed once within the threshold number of days
5. Sections of commute routes that have not been traversed within the threshold number of days
6. Sections of non-commutes that have not been traversed within the threshold number of days The prioritization module 230 can record a categorical designation for each section, for example, in metadata of the map data 260 associated with each section. The prioritization module 230 can search the map data 260 for sections having the lowest priority categorical designation, and if none are found, search for sections having the next lowest priority categorical designation, and so on. The prioritization module 230 can remove the map data 260 associated with one or more sections that currently have the lowest priority categorical designation.

Accordingly, the prioritization module 230 determines a priority for storing and removing data in a manner that supports building a locally stored map of routes that are likely to be traversed again by the vehicle 100. After the prioritization module 230 selectively removes the map data 260, at operation 555 the new section data is stored in the local storage system.

Thus, the disclosed mapping system 170 can create and manage map data 260 that provides a highly detailed, up-to-date map for routes that the vehicle 100 is most likely to travel. Other systems of the vehicle 100 can have access to map data 260 to improve the operation of functions such as autonomous driving, drive assist, safety warnings, etc. The map data 260 is created and stored locally at the vehicle 100, reducing potential privacy issues, reliance on third party updates, and reliance on network connectivity to third party systems.

FIG. 1 will now be discussed in full detail as an example environment within which the system and methods disclosed herein may operate. In some instances, the vehicle 100 is configured to switch selectively between an autonomous mode, one or more semi-autonomous operational modes, and/or a manual mode. Any mode can make use of the specialized map data 260 as described above. Switching between modes can be implemented in a suitable manner, now known or later developed. "Manual mode" means that all or a majority of the navigation and/or maneuvering of the vehicle is performed according to inputs received from a user (e.g., human driver). In one or more arrangements, the vehicle 100 can be a conventional vehicle that is configured to operate in only a manual mode.

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operatively connected to the processor(s) 110 for use thereby. The term "operatively connected," as used throughout this description, can include direct or indirect connections, including connections without direct physical contact.

In one or more arrangements, the one or more data stores 115 can implement the database 119 (FIG. 2) and, in addition the map data 260 described above, can further include preloaded map data 116. In one or more embodiments, preloaded map data 116 can be used as a reference while the mapping system 170 is compiling data to build the map in the manner described above. As the map data 260 begins to increase, where available the map data 260 can take precedence over the preloaded map data 116, and can replace the preloaded map data 116.

The preloaded map data 116 can include maps of one or more geographic areas. In some instances, the preloaded map data 116 can include information or data on roads, traffic control devices, road markings, structures, features, and/or landmarks in the one or more geographic areas. The preloaded map data 116 can be in any suitable form. In some instances, the preloaded map data 116 can include aerial views of an area. In some instances, the preloaded map data 116 can include ground views of an area, including 360-degree ground views. The preloaded map data 116 can include measurements, dimensions, distances, and/or information for one or more items included in the preloaded map data 116 and/or relative to other items included in the preloaded map data 116. The preloaded map data 116 can include a digital map with information about road geometry. The preloaded map data 116 can be high quality and/or highly detailed.

In one or more arrangements, the preloaded map data 116 can include one or more terrain maps 117. The terrain map(s)

117 can include information about the ground, terrain, roads, surfaces, and/or other features of one or more geographic areas. The terrain map(s) 117 can include elevation data in the one or more geographic areas. The terrain map(s) 117 can define one or more ground surfaces, which can include paved roads, unpaved roads, land, and other things that define a ground surface.

In one or more arrangements, the preloaded map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can work independently from each other. Alternatively, two or more of the sensors can work in combination with each other. In such case, the two or more sensors can form a sensor network. The sensor system 120 and/or the one or more sensors can be operatively connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will now be described. The example sensors may be part of the one or more environment sensors 122 and/or the one or more vehicle sensors 121. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras or infrared (IR) cameras.

The vehicle 100 can include an input system 130. An "input system" includes any device, component, system, element or arrangement or groups thereof that enable information/data to be entered into a machine. The input system 130 can receive an input from a vehicle passenger (e.g., a driver or a passenger). The vehicle 100 can include an output system 135. An "output system" includes any device, component, or arrangement or groups thereof that enable information/data to be presented to a vehicle passenger (e.g., a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or a combination thereof, now known or later developed.

The navigation system 147 can include one or more devices, applications, and/or combinations thereof, now known or later developed, configured to determine the geographic location of the vehicle 100 and/or to determine a travel route for the vehicle 100. The navigation system 147 can include one or more navigation applications to determine a travel route for the vehicle 100, e.g., based on map data 260 or preloaded map data 116. The navigation system 147 can include a global positioning system, a local positioning system or a geolocation system.

The processor(s) 110, the mapping system 170, and/or the autonomous driving module(s) 160 can be operatively connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110 and/or the autonomous driving module(s) 160 may control some or all of these vehicle systems 140.

The processor(s) 110 and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110 and/or the autonomous driving module(s) 160 can control the direction and/or speed of the vehicle 100. The processor(s) 110 and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operatively connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map based on map data 260 as described herein or determining the position of the vehicle 100 in respect to the map data 260 or the preloaded map data 116. The autonomous driving module(s) 160 can be further configured to receive lane change detection notifications and/or path estimations as described above.

The autonomous driving module(s) 160 either independently or in combination with the mapping system 170 can be configured to determine travel path(s), for example, based on the map data 260, and determine current autonomous driving maneuvers for the vehicle 100, future autonomous driving maneuvers and/or modifications to current autonomous driving maneuvers based on data acquired by the sensor system 120 and/or mapping system 170, driving scene models, and/or data from any other suitable source such as determinations derived from the sensor data 240. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1, 2, 3A, 3B, 4, and 5, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

Generally, modules as used herein include routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A mapping system of a vehicle, comprising:
one or more sensors configured to acquire information about an environment around the vehicle;
a local storage system to store data;
one or more processors; and
a memory communicably coupled to the one or more processors and storing:
a first set of instructions that when executed by the one or more processors cause the one or more processors to detect that the vehicle has traversed a section of a route and is at an end of the section, create, in response to a determination that the vehicle is at the end of the section, temporary feature data, associated with the section, that indicate features of the section detected by the one or more sensors, store the temporary feature data in the memory, fuse the temporary feature data with feature data to produce a fusion of feature data, stored in the local storage system, to create map data associated with the section when the vehicle has traversed the section and collected the temporary feature data at least a threshold number of times, and store the map data in the local storage system as stored map data; and
a second set of instructions that when executed by the one or more processors cause the one or more processors to identify one or more route sections indicated by the stored map data as being part of one or more commute routes traversed by the vehicle, and, when an amount of storage in the local storage system is insufficient for storage of the map data or the feature data, enable the storage by removing stored map data associated with one or more sections from the local storage system based at least in part on a determination that the one or more sections are not associated with the one or more commute routes.

2. The mapping system of claim 1, wherein the features include one or more of: number of lanes, lane marker type, width of lane, curvature of road, intersections, signs, stationary landmarks, elevation, road type, road grade, or existence and location of opposite direction traffic.

3. The mapping system of claim 1, wherein the first set of instructions further includes instructions to fuse the feature data with the stored map data when a similarity above a threshold amount exists between the feature data and the stored map data.

4. The mapping system of claim 1, wherein the second set of instructions further includes instructions to determine a value score for each section indicated by the stored map data, and remove the stored map data associated with the one or more sections based at least in part on the value score.

5. The mapping system of claim 4, wherein the value score for a given section of the one or more sections is determined according to a value of a recency function, a value of a frequency function, and a value of a commute indicator function, where the recency function indicates at least how recently the vehicle traversed the given section, the frequency function indicates at least how many times the vehicle has traversed the given section, and the commute indicator function indicates at least whether the given section is part of the commute route.

6. The mapping system of claim 1, wherein the second set of instructions further includes instructions to categorize each section indicated by the stored map data according to a plurality of categories, determine a priority order for the plurality of categories, and remove the stored map data associated with the one or more sections based at least in part on a category of the one or more sections.

7. The mapping system of claim 6, wherein the plurality of categories includes at least, in decreasing priority order, two or more of: sections in a most recently traversed route, sections of commute routes traversed more than once within a threshold number of days, sections of non-commute routes traversed more than once within the threshold number of days, sections traversed once within the threshold number of days, sections of commute routes that have not been traversed within the threshold number of days, or sections of non-commute routes that have not been traversed within the threshold number of days.

8. A method of creating and managing map data for a vehicle having a local storage system, comprising:
   detecting that the vehicle has traversed a section of a route and is at an end of the section;
   creating, in response to a determination that the vehicle is at the end of the section, temporary feature data associated with the section, based on features of the section detected by one or more sensors of the vehicle;
   storing the temporary feature data in a memory of the vehicle;
   fusing the temporary feature data with feature data to produce a fusion of feature data, stored in the local storage system, to create map data associated with the section when the vehicle has traversed the section and collected the temporary feature data at least a threshold number of times;
   storing the map data in the local storage system as stored map data;
   identifying one or more route sections indicated by the stored map data as being part of one or more commute routes traversed by the vehicle; and
   when an amount of storage in the local storage system is insufficient for storage of the map data or the feature data, enable the storage by removing stored map data associated with one or more sections from the local storage system based at least in part on a determination that the one or more sections are not associated with the one or more commute routes.

9. The method of claim 8, wherein the features include one or more of: number of lanes, lane marker type, width of lane, curvature of road, intersections, signs, stationary landmarks, elevation, road type, road grade, or existence and location of opposite direction traffic.

10. The method of claim 8, further comprising transmitting map data associated with at least one section to an external storage system.

11. The method of claim 8, wherein the removing the stored map data further comprises determining a value score for each section indicated by the stored map data and removing the stored map data associated with the one or more sections based at least in part on the value score.

12. The method of claim 11, wherein the value score for a given section of the one or more sections is determined according to a value of a recency function, a value of a frequency function, and a value of a commute indicator function, where the recency function indicates at least how recently the vehicle traversed the given section, the frequency function indicates at least how many times the vehicle has traversed the given section, and the commute indicator function indicates at least whether the given section is part of the commute route.

13. The method of claim 8, wherein the removing the stored the map data further comprises:
   categorizing each section indicated by the stored map data according to a plurality of categories;
   determining a priority order for the plurality of categories; and
   removing the stored map data associated with the one or more sections based at least in part on a category of the one or more sections.

14. The method of claim 13, wherein the plurality of categories includes at least, in decreasing priority order, two or more of: sections in a most recently traversed route, sections of commutes traversed more than once within a threshold number of days, sections of non-commute routes traversed more than once within the threshold number of days, sections traversed once within the threshold number of days, sections of commutes that have not been traversed within the threshold number of days, or sections of non-commutes that have not been traversed within the threshold number of days.

15. A non-transitory computer-readable medium for creating and managing map data for a vehicle, including instructions that, when executed by one or more processors, cause the one or more processors to:
   detect that the vehicle has traversed a section of a route and is at an end of the section;
   create, in response to a determination that the vehicle is at the end of the section, temporary feature data associated with the section, based on features of the section detected by one or more sensors of the vehicle;
   store the temporary feature data in a memory of the vehicle;

fuse the temporary feature data with feature data to produce a fusion of feature data, stored in a local storage system of the vehicle, to create map data associated with the section when the vehicle has traversed the section and collected the temporary feature data at least a threshold number of times;

store the map data in the local storage system as stored map data;

identify one or more route sections indicated by the stored map data as being part of one or more commute routes traversed by the vehicle; and when an amount of storage in the local storage system is insufficient for storage of the map data or the feature data, enable the storage by removing stored map data associated with one or more sections from the local storage system based at least in part on a determination that the one or more sections are not associated with the one or more commute routes.

16. The non-transitory computer-readable medium of claim 15, wherein the features include one or more of: number of lanes, lane marker type, width of lane, curvature of road, intersections, signs, stationary landmarks, elevation, road type, road grade, or existence and location of opposite direction traffic.

17. The non-transitory computer-readable medium of claim 15, further including instructions to fuse the feature data with the stored map data when a similarity above a threshold amount exists between the feature data and the stored map data.

18. The non-transitory computer-readable medium of claim 15, wherein the instructions to remove the stored map data further comprise instructions to determine a value score for each section indicated by the stored map data and remove the stored map data associated with the one or more sections based at least in part on the value score.

19. The non-transitory computer-readable medium of claim 18, wherein the value score for a given section is determined according to a value of a recency function, a value of a frequency function, and a value of a commute indicator function, where the recency function indicates at least how recently the vehicle traversed the given section, the frequency function indicates at least how many times the vehicle has traversed the given section, and the commute indicator function indicates at least whether the given section is part of the commute route.

20. The non-transitory computer-readable medium of claim 19, wherein the instructions to remove the stored map data further comprise instructions to:

categorize each section indicated by the stored map data according to a plurality of categories;

determine a priority order for the plurality of categories; and remove the stored map data associated with the one or more sections based at least in part on a category of the one or more sections.

21. A system, comprising:

a processor;

a database; and a memory storing instructions that cause the processor to:

detect that a vehicle has traversed a section of a route and is at an end of the section;

create, in response to a determination that the vehicle is at the end of the section, temporary data associated with the section;

fuse the temporary data with feature data to produce, after the vehicle has traversed the section at least a threshold number of times, map data, the feature data being stored in the database, the temporary data being stored in the memory and being associated with features detected by a sensor of the vehicle;

identify the section as being a part of a commute route; and remove, in response to a determination of insufficient storage in the memory, a portion of the map data that is not associated with the commute route.

22. The system of claim 21, wherein the instructions further cause the processor to cause an adjustment of a number of the features associated with the temporary data.

23. The system of claim 22, wherein the adjustment comprises a combination of a high number of the features to increase a degree of detail of a representation of the section.

24. The system of claim 22, wherein the adjustment comprises a use of a low number of the features to reduce an amount of storage consumed by the temporary data.

25. The system of claim 21, wherein the temporary data include metadata that indicate coordinates for at least one of the section or a certain feature.

26. The system of claim 21, wherein the coordinates comprise global positioning system coordinates.

27. The system of claim 21, wherein the certain feature comprises a landmark feature.

28. The system of claim 21, wherein the instructions that cause the processor to detect that the vehicle is at the end of the section comprise instructions to cause the processor to determine at least one of a speed of the vehicle being less than a threshold speed, a turn being made by the vehicle being greater than a threshold degree, or a source of power for the vehicle being shut down.

* * * * *